March 15, 1966 H. K. RISING ETAL 3,241,119

COUNTER CIRCUIT

Original Filed April 20, 1955 5 Sheets-Sheet 1

INVENTORS
HAWLEY K. RISING
GEORGE R. BRIGGS
WILMUR M. MCMILLAN
BY Edgar H. Kent
ATTORNEY March 15, 1966 H. K. RISING ETAL 3,241,119

COUNTER CIRCUIT

Original Filed April 20, 1955 5 Sheets-Sheet 3

March 15, 1966 H. K. RISING ETAL 3,241,119

COUNTER CIRCUIT

Original Filed April 20, 1955 5 Sheets-Sheet 4

March 15, 1966 H. K. RISING ETAL 3,241,119

COUNTER CIRCUIT

Original Filed April 20, 1955 5 Sheets-Sheet 5

United States Patent Office 3,241,119
Patented Mar. 15, 1966

3,241,119
COUNTER CIRCUIT

Hawley K. Rising, Lexington, Mass., George R. Briggs, Princeton, N.J., and Wilmur M. McMillan, Lake Katrine, N.Y., assignors, by mesne assignments, to Massachusetts Institute of Technology, a corporation of Massachusetts Original application Apr. 20, 1955, Ser. No. 502,634, now Patent No. 3,131,295, dated Apr. 28, 1964. Divided and this application Sept. 10, 1959, Ser. No. 839,258
5 Claims. (Cl. 340—172.5)

This invention relates to a counting device for counting information in digital form and more particularly to a counting system employing bi-stable magnetic elements.

This application is a divisional application of our co-pending application Serial No. 502,634, filed April 20, 1955 now Patent No. 3,131,295 for "Counter Circuit."

An object of the present invention is to provide an improved counting apparatus which utilizes magnetic cores for registering information at a very rapid rate and which is highly reliable yet simple to construct.

Another object of the present invention is to provide an improved counting apparatus which is easy to manufacture and requires comparatively little maintenance.

A still further object of the present invention is to provide an improved counting apparatus which employs a magnetic core type of shift register and circuits for algebraically combining input data, in the form of pulses, with the content of the magnetic core shift register.

Still another object of the present invention is to provide an improved counting apparatus wherein the cores of a magnetic core register are connected to form a closed loop, and circuits algebraically combine serial input data with the count stored in the magnetic core register and shift the result from the magnetic core register without disturbing its content.

Another object of the present invention is to provide an improved counting apparatus wherein the binary one's complement of zero is established in a magnetic core shift register; any number, represented by a like number of serial pulses, is subtracted from the content of the magnetic core shift register by a subtracter circuit; and signals representing the complement of the content of the magnetic core shift register are produced by a read out register whenever it is desired to obtain the instantaneous count.

Other objects of the invention will be pointed out in the following description and claims and illustrated in the accompanying drawings, which disclose, by way of example, the principle of the invention and the best mode, which has been contemplated, of applying that principle.

CONVENTIONS EMPLOYED

Figure 1:
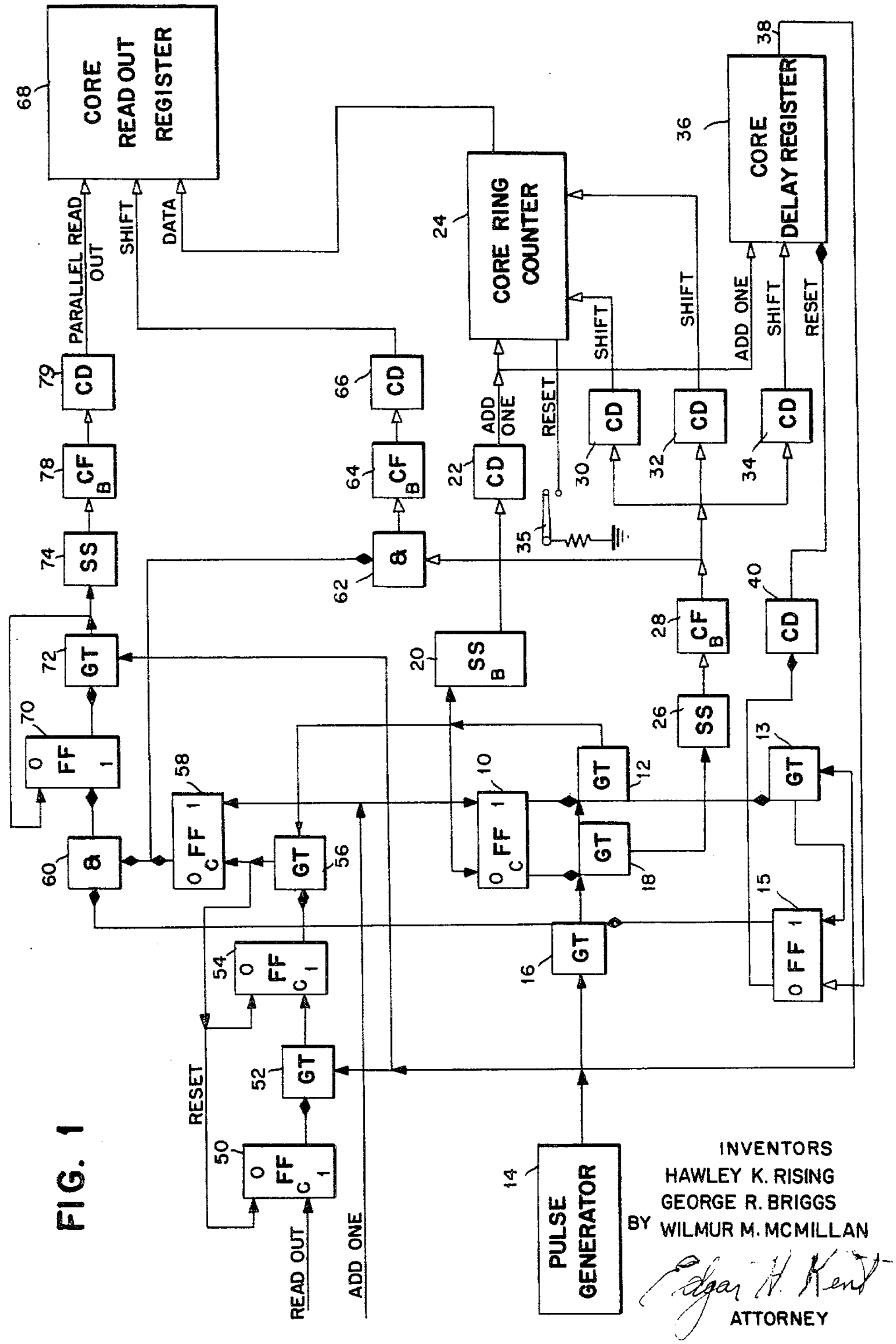
FIG. 1 is a wiring schematic in block form of a counting device constructed in accordance with the principles of this invention.

A conventional arrowhead is employed throughout the drawings to indicate (1) a circuit connection, (2) energization with positive pulses, and (3) the direction of pulse travel which is also the direction of control; a diamond shaped arrowhead indicates (1) a circuit connection, and (2) energization with a D.C. level. The D.C. levels are on the order of 10 volts when positive and 30 volts when negative; whereas pulses are .1 microsecond in duration and on the order of 20 to 40 volts in magnitude and positive unless otherwise indicated. A closed arrowhead which is not blackened indicates pulse duration greater than 0.1 microsecond. The input and output lines for the blocks in FIG. 1 are connected to the most convenient side of the block, including the same side in some cases. The wiring schematic for any block in question, together with the description given hereinafter, is sufficient to render the actual circuit connections unmistakably clear.

Reference is made to FIG. 1 for a description of the binary counter system of the present invention. This system serves to count pulses received on an input line labeled Add One and to deliver the count in response to a pulse on the input line labeled Read Out.

In response to a pulse on the Add One line, a flip-flop 10 is set in the ONE state of conduction and the resulting positive signal on the output conductor of the ONE side conditions gates 12 and 13. The first subsequent pulse from a pulse generator 14 is passed by the gate 13 to set a flip-flop 15 in the ONE state of conduction. The flip-flop 15 conditions a gate 16 to pass pulses from the pulse generator 14. The pulses passed by the gate 16 are applied to the gate 12 and to a gate 18. Since the gate 12 is conditioned, it passes a pulse which is applied to the ZERO input side of flip-flop 10; whereupon flip-flop 10 reverses its conduction state and conditions the gate 18 and deconditions the gate 12. The pulse passed by the gate 12 is also applied to a single-shot multivibrator 20 which converts the relatively narrow input pulse from the gate 12 to a relatively wide output pulse. A core driver 22 amplifies this wide output pulse and applies it to the Add One input line of a core ring counter.

Pulses from the gate 16 are passed by the gate 18 to a single-shot multivibrator 26 which generates an output pulse having a much greater width than the width of the input pulse. This wide pulse undergoes power amplification in a cathode follower 28 before being applied to core drivers 30, 32 and 34. The core drivers 30 and 32 supply shift pulses to the core ring counter 24. The core ring counter 24 is reset by momentarily closing a switch 35 which may be any suitable switching device.

The number of shift pulses required to effect the addition of a binary one to the core ring counter 24 is equal to the number of binary bits of this counter, and a core delay register 36 is provided to insure that only the required number of shift pulses is supplied to the core ring counter 24. As pointed out more specifically hereinafter, the core delay register 36 receives a signal on its Reset line which sets all cores in the core delay register to ZERO prior to the receipt of a pulse on its Add One line; while the Add One pulse causes the first core of the core delay register 36 to be set in the ONE state prior to the receipt of shift pulses on the shift input line. Whenever a binary one in the first core of the core delay register 36 has been shifted through the register and from the last stage in response to shift pulses on the shift input line, a negative signal is established on line 38 which sets the flip-flop 15 in the ZERO state in a manner pointed out in the basic circuit description hereinafter. Once the gate 16 is deconditioned by the flip-flop 15, no further pulses are passed to the core drivers 30, 32 and 34. As the flip-flop 15 assumes the ZERO state of conduction, core driver 40 receives a positive signal level which is applied to the reset line of the core delay register 36 to set all cores in the ZERO state. From the foregoing it is seen that the core delay register 36 serves to control the exact number of shift pulses applied to the core ring counter 24.

If it is desired to read the contents from the core ring counter 24, a pulse is applied to a line labeled Read Out. A pulse on this line sets a flip-flop 50 in the ONE state which conditions a gate 52. The first succeeding pulse from the pulse generator 14 is passed by the gate 52 and sets a flip-flop 54 in the ONE state, thereby conditioning a gate 56. When the next Add One pulse is received, the flip-flop 10 and a flip-flop 58 are set in the ONE state of conduction. The next pulse passed by the gate 12, in addition to being applied to the flip-flop 10 and the single-shot multivibrator 20 as above described, is applied to the gate 56 which passes this pulse to the ZERO input side of a flip-flop 58. The ZERO output side of this flip-flop is applied as one of two inputs to a two-input AND circuit 60 which has as its other input a signal level from the ONE output side of the flip-flop 15. The flip-flop 15, as previously pointed out, is set on the ONE side immediately after the Add One pulse is received. The ZERO output signal level of the flip-flop 58 is also applied to an AND circuit 62. Shift pulses then applied to the AND circuit 62 from the cathode follower 28 are passed since flip-flop 58 is in the ZERO state of conduction. These shift pulses undergo power amplification in cathode follower 64 and core driver 66 before being applied to the shift input of the core read out register 68. Information shifted serially from the core ring counter 24 is conveyed on a conductor labeled Data to the core read out register 68. The content of the core ring counter 24 is serially shifted into the core read out register 68 as shift pulses are applied simultaneously to both devices.

The output of the AND circuit 60 is applied to the ONE input side of a flip-flop 70 which in turn conditions a gate 72. The flip-flop 70 is set in the ONE state in response to a falling D.C. level from the AND circuit 60. How this operation is obtained is explained in the subsequent discussion on basic circuits. The next pulse from the pulse generator 14 is passed by the gate 72 and sets flip-flop 70 back in the ZERO state of conduction which deconditions the gate 72. The pulse passed by the gate 72 is applied also to a single-shot multivibrator 74 which converts the narrow input pulse to a wide pulse. This wide pulse is applied through a cathode follower 78 and a core driver 79 to an input conductor of the core read out register 68 labeled Parallel Read Out. A pulse on this conductor causes parallel read out of information which was previously shifted serially into the core read out register 68.

Figure 2:
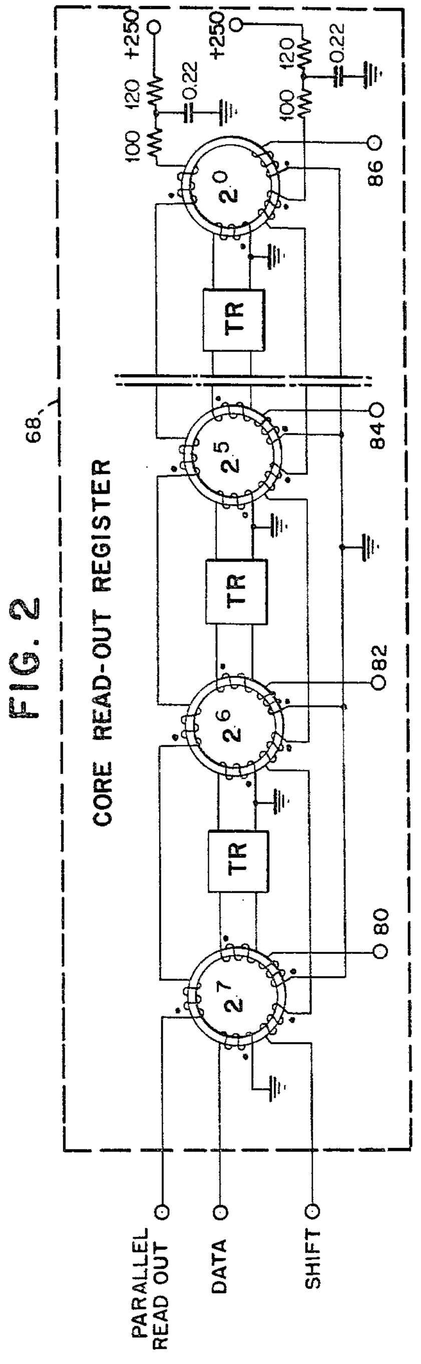
FIG. 2 illustrates a wiring schematic of a core read out register shown in block form in FIG. 1.
Figure 3:
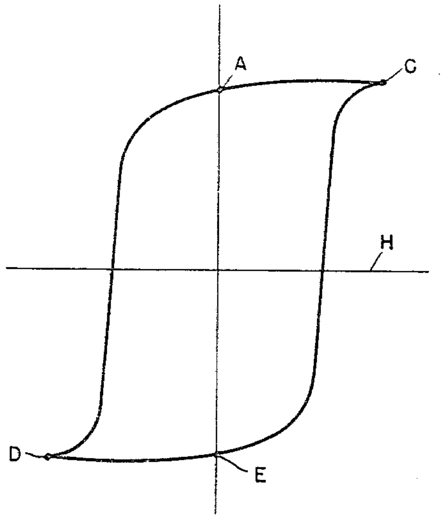
FIG. 3 is a curve illustrating a preferred hysteresis characteristic of the magnetic cores involved.

Reference is made to FIG. 2 for a description of the core read out register 68. An eight stage core read out register is herein employed since the core ring counter 24 is an eight stage counter. The cores employed in the apparatus of the present invention are made of commercially obtainable magnetic materials having a hysteresis loop substantially as illustrated in FIG. 3. Since points A and E on the curve in FIG. 3 are representative of stable remanent magnetic states, they may be considered representative of binary information stored in a magnetic core. The cores of the present invention may be driven to either of these magnetic states by the application of a positive or a negative magnetomotive force, respectively. If the state of remanence of a core made of such material is that indicated by the point A, application of a positive magnetomotive force greater than the coercive force causes the core to traverse the hysteresis curve to point C, and upon relaxation of this positive force, revert to point A. Application of a negative magnetomotive force greater than the coercive force causes the state of remanence to follow the curve to point D, and when the force is terminated, to traverse to point E. Similarly with the remanent state of a core standing at point E, the application of a negative magnetomotive force causes the curve to be traversed to point D and returned to point E when the negative force is relaxed; while a positive force greater than the coercive force causes a traversal of the curve from point E to point C and return to point A when the force is terminated. With the state of remanence indicated at point A arbitrarily selected as representing a binary ONE and the state of remanence indicated at point E as representing a binary ZERO, application of a negative magnetomotive force by pulsing a shift winding on a core simultaneously causes a voltage to be induced in an output sense winding if the core was previously in the ONE state; while a negligible voltage is induced in the output winding if the core was previously in the ZERO state. In order to indicate how the turns of a winding are placed on a core, the dot convention is employed to indicate that a positive voltage exists at the dotted end whenever a shift pulse is applied.

Referring again to FIG. 2, a pulse applied to the input conductor labeled Shift causes all the cores to be driven to the ZERO magnetic state indicated by the point E on the curve in FIG. 3. Information previously contained in the cores is serially transferred to the succeeding core, from left to right, by means of transfer circuits coupled between cores and labeled TR. Prior to each shift pulse the input line labeled Data is pulsed or not pulsed depending on whether a ONE or a ZERO, respectively, was supplied. Once filled with serial information, the core read out register 68 is emptied by a pulse on the line labeled Parallel Read Out which drives all cores to the ONE state. Terminals 80, 82, 84 and 86 are energized with a voltage pulse having substantial magnitude if a ZERO was previously stored in the associated core or a negligible voltage if a ONE was previously stored in the associated core. This operation of changing Zeros to Ones and vice versa is termed complementing.

Figure 4:
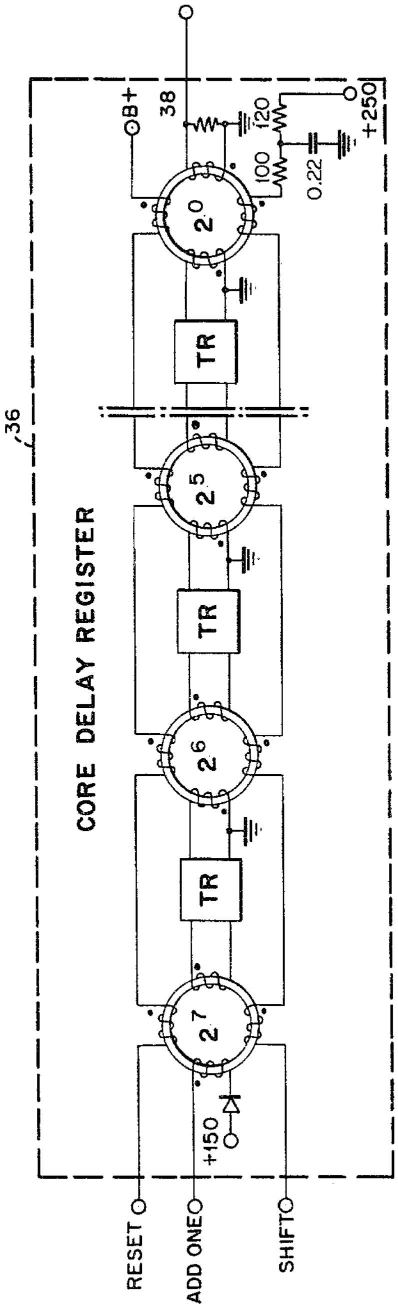
FIG. 4 illustrates a wiring schematic of the core delay register shown in block form in FIG. 1.

Referring now to FIG. 4, the core delay register 36 is made 8 bits in size since the core ring counter 24 (FIG. 1) is also 8 bits in size. A pulse on the conductor labeled Reset causes all cores in this register to assume the ZERO magnetic state indicated by the point E on the curve in FIG. 3. A pulse on the conductor labeled Add One causes the $2^7$ core to be set in the ONE state, and subsequent pulses on the conductor labeled Shift causes the ONE state to be shifted to succeeding cores from left to right. An output pulse derived from the $2^0$ core is negative when it changes from the ONE state to the ZERO state. This is indicated by the dot on the lower side of the output winding which signifies a polarity opposite to that indicated by the dot on the upper side of the preceding output winding. This negative pulse serves to set flip-flop 15 (FIG. 1) in the ZERO state of conduction.

Figure 5:
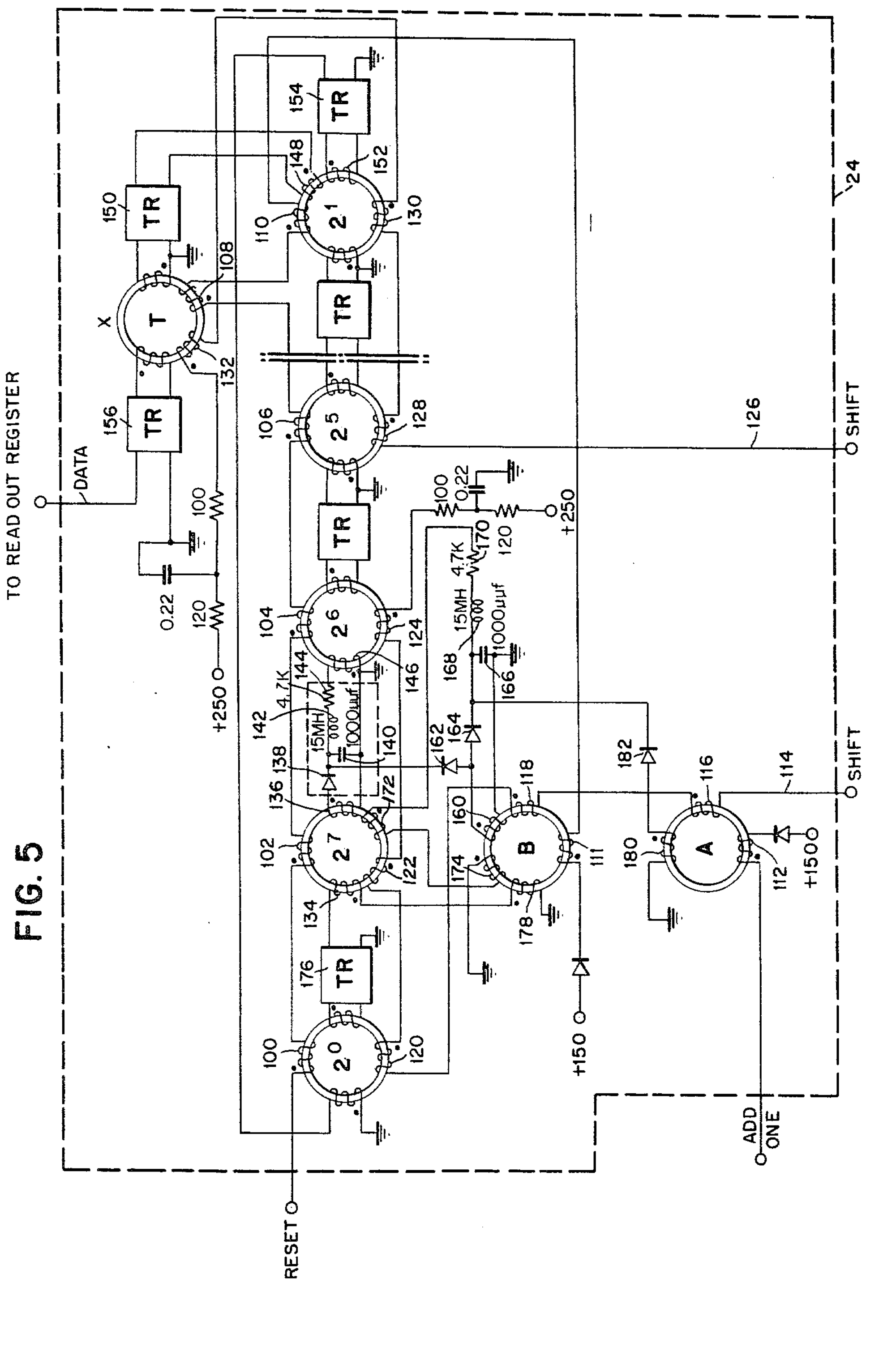
FIG. 5 illustrates a wiring schematic of the core ring counter shown in block form in FIG. 1.

Referring now to FIG. 5, the core ring counter 24 is shown with cores $2^0$ through $2^7$ connected to form a closed loop. Whenever a pulse is applied to the input line labeled Reset, cores $2^0$ through $2^7$ and a core labeled T are set to the ONE state of magnetization represented by point A on the curve in FIG. 3 and a core labeled B is set to the ZERO state represented by point E on the curve in FIG. 3. Windings 100, 102, 104, 106, 108, 110 and 111 are termed reset windings. In response to a pulse on the line labeled Add One, a winding 112 sets a core labeled A in the ONE state represented by the point A on the curve in FIG. 3. The two input lines labeled Shift are employed to divide the load and permit the use of core drivers having lower power outputs. These shift lines are pulsed simultaneously by core drivers 30 and 32 in FIG. 1. A shift pulse on line 114 applies a magnetomotive force on cores A, B, $2^0$, $2^7$ and $2^6$ by means of respective windings 116, 118, 120, 122 and 124 to set these cores in the ZERO state represented by the point E on the curve in FIG. 3. A pulse on the shift line 126 changes cores $2^5$ through $2^1$ and core T to the ZERO state represented by point E on the curve in FIG. 3 by means of respective windings 128, 130 and 132 respectively. Each of the cores $2^0$ through $2^7$ has an input winding and an output winding thereon. On core $2^7$, for example, winding 134 is the input winding and winding 136 is the output winding. If core $2^7$ is in the ONE state of magnetization represented by the point A on the curve in FIG. 3 whenever a shift pulse having sufficient magnitude to exceed the coercive force is applied on the winding 122, this core is driven to that state indicated by point D on the curve in FIG. 3, and upon termination of this pulse, the core proceeds to the ZERO magnetic state represented by the point E on the curve in FIG. 3. This induces a substantial voltage across the output winding 136 which is passed by a diode 138 and charges a condenser 140. As soon as the voltage across the winding 136 commences to decay, the diode 138 ceases to conduct and offers a high impedance which prevents the condenser 140 from discharging through the diode 138 and the winding 136; whereupon the condenser 140 discharges through a circuit including an inductance 142, a resistor 144 and an input winding 146 of the $2^6$ core. The discharge current through winding 146 is sufficient in magnitude to develop a magnetomotive force greater than the coercive force and thereby set core $2^6$ in the ONE state of magnetization represented by the point A on the curve in FIG. 3. The circuit components connected between the output winding 136 on core $2^7$ and the input line 146 on core $2^6$ constitute a transfer circuit shown throughout the drawings in block form and labeled TR. Thus it is seen that information in cores $2^0$ through $2^7$ may be shifted serially around the loop in response to shift pulses.

An additional winding 148 on core $2^1$ is coupled through a transfer circuit 150 to a core labeled T. Since winding 152, an output winding on the $2^1$ core, is coupled through a transfer circuit 154 to core $2^0$, it is seen that the same information is stored in both the T core and the $2^0$ core. The transfer circuit 154 serves to close the loop and thereby form a ring circuit; while transfer circuit 150 serves as a means to obtain information from the ring circuit. The output from core T is supplied through a transfer circuit 156 to an output line labeled Data. This date line is connected to the core read out register 68 shown in FIGS. 1 and 2.

The core B in FIG. 5 has an output winding 160 connected through a diode 162 to the non-grounded plate of the condenser 140 and through a diode 164 to the non-grounded plate of a condenser 166. Whenever the winding 160 has an induced voltage as core B changes its magnetic state from a ONE to a ZERO, diodes 162 and 164 permit charging current to flow in condensers 140 and 166. When the charging current terminates, these condensers discharge. Condenser 140 discharges in the manner previously pointed out, and condenser 166 discharges through an inductance 168, a resistor 170, a winding 172 on core $2^7$ and a winding 174 on core B. The discharge current through winding 172 establishes a magnetomotive force in a direction to write a ZERO in the $2^7$ core; whereas the discharge current through winding 174 establishes a magnetomotive force on core B to write a ONE.

Whenever the $2^0$ core changes its magnetic state from ONE to ZERO, the resulting discharge current from a transfer circuit 176 establishes a magnetomotive force around winding 134 which is in a direction to write a ONE in the $2^7$ core and establishes a magnetomotive force around winding 178 on core B in a direction to write a ZERO. It is noted that winding 172 is poled opposite to the winding 134 on the $2^7$ core, and the winding 174 is poled opposite to the winding 178 on the core B.

Whenever an Add One pulse is applied to the winding 112 on core A, this core is set in the ONE state. A subsequent shift pulse on winding 116 changes the A core to the ZERO state and induces a voltage on winding 180. The resulting current passed by diode 182 charges the condenser 166 which, upon discharge, tends to write a ZERO in the $2^7$ and a ONE in the B core.

Because of the increased load to be driven by the output winding 160 on the B core, the shift winding 118 on this core may have approximately twice as many turns as the other shift windings. It may be desirable in the interest of better reliability to increase the shift winding 122 on the $2^7$ core by about five turns since opposing magnetomotive forces might tend to reduce the voltage across the output winding 136.

Although the A and B cores together with their associated circuits in FIG. 5 perform the function of a subtracter, the term "Add One pulse" is consistently employed throughout the description of the preferred embodiment since the overall function of the apparatus disclosed is to count.

From the foregoing discussion of the core ring counter 24 the following rules may be stated:

(1) If the core A is in the ONE state when a shift pulse is applied, then the $2^7$ core which is set in the ZERO state by the shift pulse will remain in the ZERO state irrespective of the contents of the $2^0$ core. This is true because the discharged current from condenser 166 through winding 172 inhibits the writing of a ONE in the $2^7$ core.

(2) If core A is in the ONE state when a shift pulse is applied, the B core will be set to the ONE state if the $2^0$ core previously contained a ZERO. This is true because the discharge current from condenser 166 through the winding 174 writes a ONE in the B core and there is no magnetomotive force established by the winding 178 to oppose the magnetomotive force of the winding 174.

(3) Whenever the core B is in the ONE state and a shift pulse is applied, the $2^6$ core will be set to the ONE state because the winding 160 of the core B supplies a current to charge condenser 140 which, on discharge, sets the $2^6$ core to the ONE state.

(4) Whenever both the $2^0$ and the B core are in the ONE state and a shift pulse is applied, the $2^7$ core will be set to the ZERO state by the shift pulse and will remain there. This follows since the windings 134 and 172 on the $2^7$ core oppose each other.

(5) Whenever the $2^0$ core contains a ZERO and the B core contains a ONE as a shift pulse is applied, the $2^7$ core will be set to ZERO and the B core will be set again to the ONE state. This is true because transfer circuit 176 supplies a negligible voltage to associated input windings 134 and 178; consequently the discharge current from the condenser 166 through the windings 172 and 174 sets a ONE in the B core and tends to set a ZERO in the $2^7$ core which was set to ZERO by the shift pulse.

(6) If the A core and the B core are in the ZERO state when a shift pulse is applied, information in the ring circuit, composed of cores $2^0$ through $2^7$, is not affected except to make a straightforward shift one position to the right.

In operation, the counter is initially reset by closing switch 35 in FIG. 1 which energizes the reset line in FIG. 5. This sets the $2^0$ through $2^7$ cores in the ONE state and the B core in the ZERO state. After an Add One pulse is applied to the A core in FIG. 5, eight shift pulses are simultaneously applied to both shift lines 114 and 126. In the preferred embodiment the Add One pulses and the shift pulses are 2.5 microseconds wide when applied to the core ring counter 24. The shift pulses preferably occur at a constant rate 20 microseconds apart; while the Add One pulses may occur at a random rate with a minimum interval of about 250 microseconds. Read out from the core ring counter 24 can occur without interrupting the counting operation as will now be described.

Serial transfer of information from the core ring counter 24 to the core read out register 68 can occur without interrupting the operation of the core ring counter. To illustrate the read out operation, assume the Read Out line in FIG. 1 is pulsed. This pulse causes the AND circuit 62 to be conditioned in a manner previously described. The AND circuit 62 is not conditioned, however, until the next Add One pulse is received and a pulse is passed by the gates 12 and 56 to set the flip-flop 58 in the ZERO state. As shift pulses are supplied by cathode follower 28 through the core drivers 30 and 32 to the core ring counter 24, these shift pulses are applied also through the AND circuit 62, when conditioned, to the core read out register 68. Information from the T core of the core ring counter 24 (FIG. 5) is serially shifted into the core read out register 68 (FIGS. 1 and 2) as shift pulses are simultaneously applied to both devices. It is recalled that the T core contains the same information as the $2^0$ core of the core ring counter 24; consequently the information shifted from the T core represents the count, in complement form, contained in the core ring counter prior to the last received Add One pulse.

As the last or eighth shift pulse is applied to the core ring counter 24 and the core read out register 68 completes the above serial transfer of information, a negative pulse on conductor 38 causes the flip-flop 15 to decondition the AND circuit 60. The deconditioning of this AND circuit sets the flip-flop 70 in the ONE state and permits the gate 72 to pass a pulse to the Parallel Read Out line. As set forth in the discussion of FIG. 2, this pulse causes information in the core read out register 68 to be complemented as it is read out in parallel. It is pointed out that the information read from the core read out register 68 represents the count contained in the core ring counter 24 at the time the Read Out pulse was received.

In order to illustrate the operation of the core ring counter 24, assume that a pulse is applied to the reset line in FIG. 5. Cores $2^0$ through $2^7$ are set to the ONE state and core B is set to the ZERO state. Now assume that the first Add One pulse is applied to the core A which sets it in the ONE state. As noted in the discussion of FIG. 1, eight shift pulses on lines 114 and 126 automatically follow each Add One pulse. The first shift pulse following an Add One pulse causes capacitor 166 to be charged since the A core changes from the ONE to the ZERO state. This condenser discharges through windings 172 and 174 as the transfer circuit 176 is discharging through the windings 134 and 178. Because the magnetomotive force around the winding 172 opposes the magnetomotive force around the winding 134, the two magnetomotive forces neutralize each other and the $2^7$ core remains in the ZERO state established therein by the shift pulse. Since the magnetomotive force around winding 178 which is in a direction to set the B core to the ZERO state opposes the magnetomotive force of winding 174 which tends to set the B core in the ONE state, the magnetomotive forces of these windings are neutralized, and core B remains in the ZERO state established by the shift pulse. Since the A and B cores are now in the ZERO state, they will not affect the information in the $2^0$ through $2^7$ cores during the subsequent seven shift pulses. These seven shift pulses cause information in the ring circuit to be advanced successively seven times to the right. Reference is made to Table 1 below which shows graphically the contents of each core following the first Add One pulse and the subsequent eight shift pulses.

*Table 1.—1st Add One operation*

| | A | B | $2^7$ | $2^6$ | $2^5$ | $2^4$ | $2^3$ | $2^2$ | $2^1$ | $2^0$ | T |
|---|---|---|---|---|---|---|---|---|---|---|---|
| Add One | 1 | 0 | 1 | 1 | 1 | 1 | 1 | 1 | 1 | 1 | 1 |
| 1st shift | 0 | 0 | 0 | 1 | 1 | 1 | 1 | 1 | 1 | 1 | 1 |
| 2nd shift | 0 | 0 | 1 | 0 | 1 | 1 | 1 | 1 | 1 | 1 | 1 |
| 3rd shift | 0 | 0 | 1 | 1 | 0 | 1 | 1 | 1 | 1 | 1 | 1 |
| 4th shift | 0 | 0 | 1 | 1 | 1 | 0 | 1 | 1 | 1 | 1 | 1 |
| 5th shift | 0 | 0 | 1 | 1 | 1 | 1 | 0 | 1 | 1 | 1 | 1 |
| 6th shift | 0 | 0 | 1 | 1 | 1 | 1 | 1 | 0 | 1 | 1 | 1 |
| 7th shift | 0 | 0 | 1 | 1 | 1 | 1 | 1 | 1 | 0 | 1 | 1 |
| 8th shift | 0 | 0 | 1 | 1 | 1 | 1 | 1 | 1 | 1 | 0 | 0 |

If a second Add One pulse is applied to core A, it is again set to the ONE state. The first shift pulse which automatically follows the Add One pulse causes the B core to be set to the ONE state and the $2^7$ core to be set to the ZERO state because the magnetomotive forces on windings 172 and 174 are unopposed by the magnetomotive forces on the windings 134 and 178 respectively. Following the first shift pulse, the B core is in the ONE state; while the $2^7$ and A cores are in the ZERO state. Upon receipt of the second shift pulse, the B core causes a ONE to be established in the $2^6$ core as the B core is changed to the ZERO state. More specifically, the second shift pulse causes condensers 140 and 166 to be charged. The magnetomotive forces established around windings 172 and 174 by the discharge current of condenser 166 and opposed by the magnetomotive forces on windings 134 and 178 respectively since the $2^0$ core was previously in the ONE state. Since the $2^7$ core was previously in the ZERO state, condenser 140 receives no charging current from the output winding 136 on the $2^7$ core; however, condenser 140 does receive charging current from the winding 160 of the B core which causes the $2^6$ core to be changed to the ONE state. Since the B core is changed to the ZERO state following the second shift pulse and since the A core is in the ZERO state after the first shift pulse, no change is made in the information contained in the ring circuit for the succeeding six shift pulses except six straightforward shifts successively to the right. Table 2 below illustrates graphically the contents of each core following each of the pulses.

*Table 2.—2nd Add One operation*

| | A | B | $2^7$ | $2^6$ | $2^5$ | $2^4$ | $2^3$ | $2^2$ | $2^1$ | $2^0$ | T |
|---|---|---|---|---|---|---|---|---|---|---|---|
| Add One | 1 | 0 | 1 | 1 | 1 | 1 | 1 | 1 | 1 | 0 | 0 |
| 1st shift | 0 | 1 | 0 | 1 | 1 | 1 | 1 | 1 | 1 | 1 | 1 |
| 2nd shift | 0 | 0 | 0 | 1 | 1 | 1 | 1 | 1 | 1 | 1 | 1 |
| 3rd shift | 0 | 0 | 1 | 0 | 1 | 1 | 1 | 1 | 1 | 1 | 1 |
| 4th shift | 0 | 0 | 1 | 1 | 0 | 1 | 1 | 1 | 1 | 1 | 1 |
| 5th shift | 0 | 0 | 1 | 1 | 1 | 0 | 1 | 1 | 1 | 1 | 1 |
| 6th shift | 0 | 0 | 1 | 1 | 1 | 1 | 0 | 1 | 1 | 1 | 1 |
| 7th shift | 0 | 0 | 1 | 1 | 1 | 1 | 1 | 0 | 1 | 1 | 1 |
| 8th shift | 0 | 0 | 1 | 1 | 1 | 1 | 1 | 1 | 0 | 1 | 1 |

The A core is set to the ONE state upon receipt of the third Add One pulse. The A core is set to ZERO by the first shift pulse which automatically follows the Add One pulse; while the B core and the $2^7$ core remain in the ZERO states following this first shift because the $2^0$ core contained a ONE. The second and subsequent shift pulses cause information in the ring circuit to be advanced successively to the right. Table 3 below shows graphically the content of each core after each of the pulses.

*Table 3.—3rd Add One operation*

| | A | B | $2^7$ | $2^6$ | $2^5$ | $2^4$ | $2^3$ | $2^2$ | $2^1$ | $2^0$ | T |
|---|---|---|---|---|---|---|---|---|---|---|---|
| Add One | 1 | 0 | 1 | 1 | 1 | 1 | 1 | 1 | 0 | 1 | 1 |
| 1st shift | 0 | 0 | 0 | 1 | 1 | 1 | 1 | 1 | 1 | 0 | 0 |
| 2nd shift | 0 | 0 | 0 | 0 | 1 | 1 | 1 | 1 | 1 | 1 | 1 |
| 3rd shift | 0 | 0 | 1 | 0 | 0 | 1 | 1 | 1 | 1 | 1 | 1 |
| 4th shift | 0 | 0 | 1 | 1 | 0 | 0 | 1 | 1 | 1 | 1 | 1 |
| 5th shift | 0 | 0 | 1 | 1 | 1 | 0 | 0 | 1 | 1 | 1 | 1 |
| 6th shift | 0 | 0 | 1 | 1 | 1 | 1 | 0 | 0 | 1 | 1 | 1 |
| 7th shift | 0 | 0 | 1 | 1 | 1 | 1 | 1 | 0 | 0 | 1 | 1 |
| 8th shift | 0 | 0 | 1 | 1 | 1 | 1 | 1 | 1 | 0 | 0 | 0 |

The fourth Add One pulse again sets the A core to the ONE state. The B core is in the ONE state and the $2^7$ core is in the ZERO state after the first shift pulse because the $2^0$ core previously contained a ZERO. The second shift pulse causes the B core to write a ONE in the $2^6$ core. Also a ONE is rewritten in the B core because the $2^0$ core previously was a ZERO. The third shift pulse causes a ONE to be set in the $2^6$ core. The B core is set to the ZERO state this time because the $2^0$ core previously contained a ONE. The subsequent five shift pulses cause information in the ring circuit to be advanced successively five times to the right. Table 4 below shows graphically the contents of each core following each of the pulses.

*Table 4.—4th Add One operation*

| | A | B | $2^7$ | $2^6$ | $2^5$ | $2^4$ | $2^3$ | $2^2$ | $2^1$ | $2^0$ | T |
|---|---|---|---|---|---|---|---|---|---|---|---|
| Add One | 1 | 0 | 1 | 1 | 1 | 1 | 1 | 1 | 0 | 0 | 0 |
| 1st shift | 0 | 1 | 0 | 1 | 1 | 1 | 1 | 1 | 1 | 0 | 0 |
| 2nd shift | 0 | 1 | 0 | 1 | 1 | 1 | 1 | 1 | 1 | 1 | |
| 3rd shift | 0 | 0 | 0 | 1 | 1 | 1 | 1 | 1 | 1 | 1 | |
| 4th shift | 0 | 0 | 1 | 0 | 1 | 1 | 1 | 1 | 1 | 1 | |
| 5th shift | 0 | 0 | 1 | 1 | 0 | 1 | 1 | 1 | 1 | 1 | |
| 6th shift | 0 | 0 | 1 | 1 | 1 | 0 | 1 | 1 | 1 | 1 | |
| 7th shift | 0 | 0 | 1 | 1 | 1 | 1 | 0 | 1 | 1 | 1 | |
| 8th shift | 0 | 0 | 1 | 1 | 1 | 1 | 1 | 0 | 1 | 1 | |

The application of further Add One pulses causes the core ring counter to advance the count in a manner similar to that pointed out above. The content of the counter must be read out before or at the time it is full; otherwise the true count is lost. In the preferred embodiment which illustrates an eight stage counter, the counter is full when 256 Add One pulses are received. The 257th Add One pulse and the eight shift pulses which automatically follow cause all cores in the ring circuit to be set in the ONE state which is the reset condition. Although an eight stage core ring counter is illustrated and described in the preferred embodiment it is understood that the number of stages employed can be increased or diminished as desired. Hence a novel binary counter system is provided which can receive pulses at a random rate and accomplish the counting by means of a core ring counter. Moreover, the count can be read out without interrupting the counting operation or destroying the content of the counter.

The mathematics involved in the counting system in the present invention may be stated as follows: If a number X is subtracted from the complement of zero of any number, the complement of the result gives the positive value of X. This proposition is true for any radix. For example the following illustration in binary numbers is given:

| | |
|---|---|
| Complement of zero | 1111 |
| —X | — 11 |
| Result | 1100 |
| Complement of result which is +X | 0011 |

In the preferred embodiment of the present invention the complement of zero is set in the core ring counter by a pulse on the Reset line. The quantity of —X is set in the counter by successively subtracting one's in the form of pulses applied to the Add One line. The result at any instant is the content of the core ring counter after it has completed its automatic shifts following the Add One pulse. After the result is transferred from the core ring counter 24 in FIG. 1 to the core read out register 68, the result is complemented. Thus the core read out register 68 supplies +X on output lines 80 through 86 with one's being represented by a pulse and zero's by the absence of a pulse.

BASIC CIRCUITS

Figure 6:
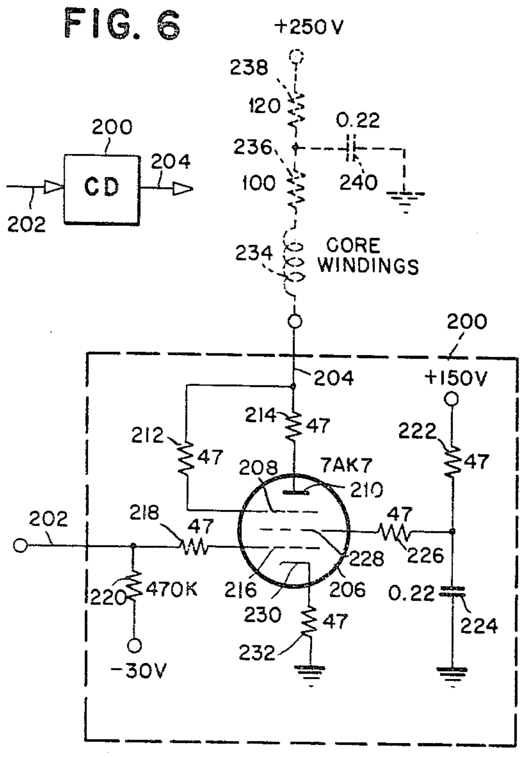
FIG. 6 illustrates a wiring schematic of one type of core driver shown in blocking form in FIG. 1

Reference is made to FIG. 6 for a description of one of the two types of core drivers employed. A first type of core driver 200 of FIG. 6 receives a pulse on input conductor 202 and delivers a pulse on output conductor 204 of substantially the same shape having increased power. A tetrode-connected pentode 206 has its suppressor grid 208 connected to an anode 210 through resistors 212 and 214. The resistor 214 is connected between the anode 212 and the output conductor 204. Control grid 216 is connected to a bias source of —30 volts by resistors 218 and 220. An input pulse on a line 202 is applied through resistor 218 to the control grid 216. A decoupling network comprising a resistor 222 and a condenser 224 is connected through a resistor 226 to a screen grid 228. This decoupling network serves to minimize voltage variations on the screen grid 228 and the +150 volt source from affecting each other. Cathode 230 is connected to ground through a resistor 232. The 47 ohm resistors connected to the electrodes of the type 7AK7 vacuum tube 206 serve to suppress parasitic voltages. The anode circuit of the vacuum tube 206 is completed through the various elements shown in dotted line form which include core windings represented by an inductance 234, a resistor 236, a resistor 238 serially connected to a source of positive 250 volts. The junction point of resistors 236 and 238 is connected to ground through a condenser 240. The resistor 238 and the condenser 240 serve as a decoupling network while the resistor 236 serves as a current limiting resistor. Since the core driver 200 delivers a substantial amount of power, it is employed in each of the core drivers, 30, 32, 34, 40, 66 and 79 shown in block form in FIG. 1. It is noted that these core drivers supply shift pulses to a plurality of cores.

Figure 7:
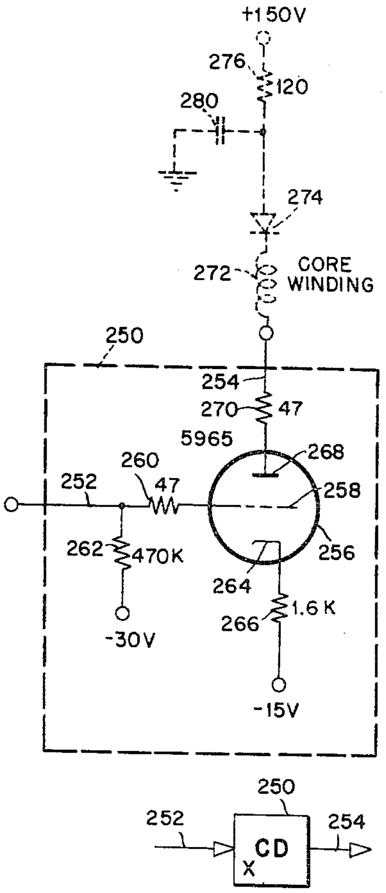
FIG. 7 illustrates a wiring schematic of another type of core driver shown in block form in FIG. 1.

Referring now to FIG. 7 a second type of core driver 250 receives a pulse on input conductor 252 and delivers a pulse on output conductor 254 which has substantially the same wave shape with increased power. The power output from the core driver 250 is substantially less than the power output of the core driver 200 since it is merely required to supply sufficient pulse power to set two cores. This circuit is employed in the core driver labeled 22 and shown in block form in FIG. 1.

A vacuum tube 256 of the core driver 250 in FIG. 7 has its grid 258 connected through resistors 260 and 262 to a bias source of negative 30 volts. A pulse on the input conductor 252 is applied through the resistor 260 to the control grid 258. A cathode 264 is connected through a resistor 266 to a negative source of 15 volts. An anode 268 is connected through a resistor 270 to the output conductor 254. The anode circuit of the vacuum tube 256 includes the resistor 270 and additional elements shown in dotted form which include a core winding represented by an inductance 272, diode 274, resistor 276, capacitor 280 and a source of positive 150 volts. The resistor 276 and a condenser 280, connected as shown, serves as a decoupling network to prevent voltage variations of the anode 268 and a positive 150 volts source from substantially affecting each other. The vacuum tube 256 is preferably one half of a type 5965 twin triode vacuum tube.

While the gates and AND circuits shown in block form throughout FIG. 1 may be conventional circuits, they are preferably of the type illustrated and described in copending U.S. application Serial Number 414,459 filed March 4, 1954 by B. L. Sarahan et al. now Patent No. 2,994,478. The type B cathode follower may be of the type shown and described in the above mentioned copending application wherein the cathode resistance value $R_k$ is 17.15 kilo-ohms. The pulse generator 14 in FIG. 1 may be any conventional free-running pulse generator which is capable of generating pulses 0.1 microsecond in width and 20 microseconds apart. While the single shot multi-vibrators 20, 26 and 74 shown in block form in FIG. 1 may be any conventional single-shot multivibrator which will yield an output pulse approximately 2.5 microseconds in width, they are preferably of the type shown and described in copending U.S. application Serial Number 474,346 filed on December 10, 1954 by W. L. Jackman now Patent No. 2,954,528. Although the type C flip-flop shown in block form throughout FIG. 1 may be one of many conventional varieties it is preferably of the type shown and described in copending U.S. application Serial Number 494,982 filed on March 17, 1955 by Robert R. Everett et al. now Patent No. 2,988,735.

Figure 8:
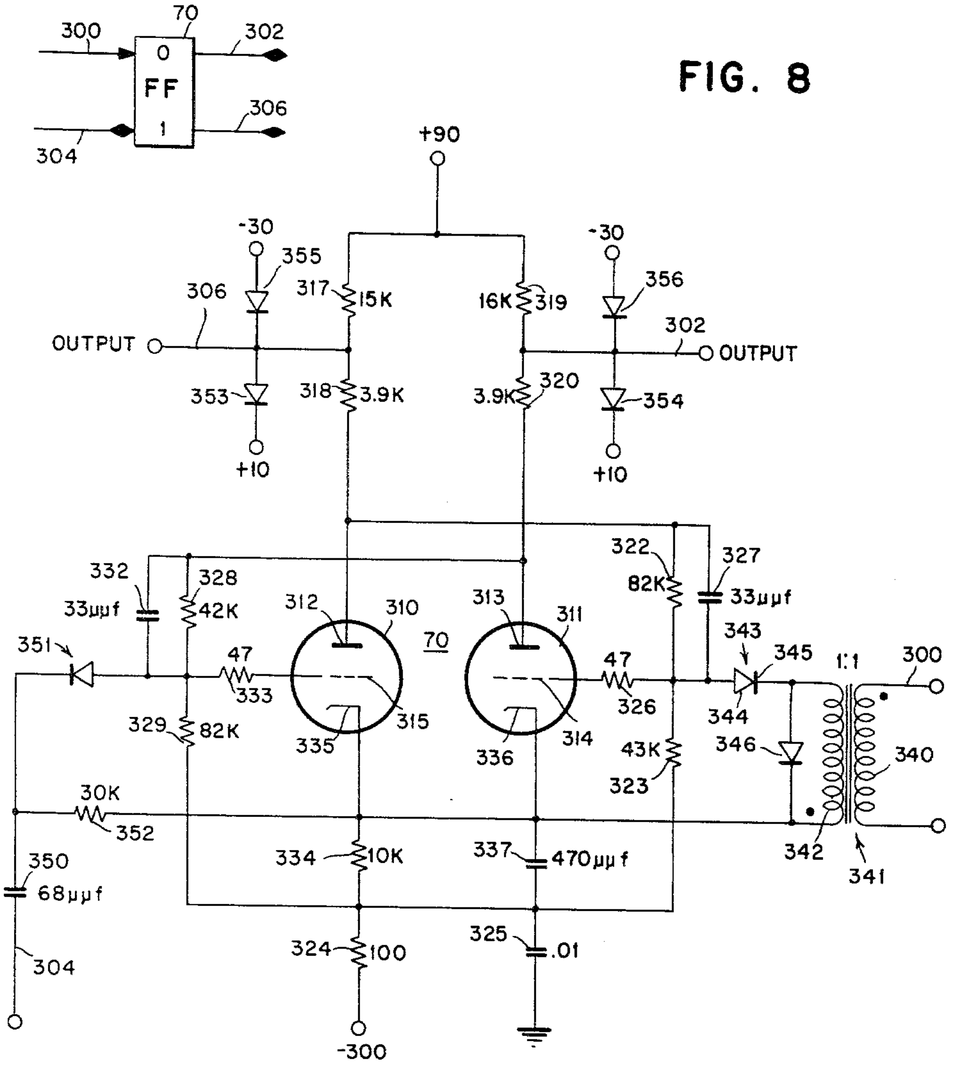
FIG. 8 illustrates a wiring schematic of one type of flip-flop circuit employed in FIG. 1.

The flip-flop circuit 70 in FIG. 1 is shown in detail in FIG. 8. A 0.1 microsecond pulse on conductor 300 establishes a positive D.C. level on output conductor 302 while a negative going signal level on conductor 304 establishes a positive D.C. level on output conductor 306. The flip-flop 70, a bi-stable electronic circuit, includes two amplifying vacuum tubes 310 and 311 which may be the respective halves of a 5965 twin triode. Anodes 312 and 313 of the vacuum tubes 310 and 311 are cross-coupled to control grids 314 and 315 as shown. If one of the amplifying tubes 310 or 311 is conducting, the other is non-conducting except during a transition in state when both tubes may be non-conducting momentarily.

Operating D.C. potential is supplied to the anode 312 through series connected resistors 317 and 318 while operating D.C. potential is supplied through series connected resistors 319 and 320 to the anode 313.

A voltage divider network which constitutes part of the load circuit for anode 312 includes resistors 322, 323 and 324 connected serially between the anode 312 and a source of —300 volts. The resistor 324 and a condenser 325 serve as a decoupling network which prevents voltage fluctuations in the —300 volts source from materially affecting the potential across the voltage divider network; also, voltage fluctuations across the voltage divider network are substantially prevented from affecting the —300 volts source. Control voltage for the grid 314 of the vacuum tube 311 is obtained from the junction point of the resistors 322 and 323 of the voltage divider network through a resistor 326. A condenser 327, connected in parallel with the resistor 322, serves as a compensating capacitor which helps to insure that the voltage wave at the anode 312 during a change of state is applied with sufficient amplitude and proper shape to the grid 314. This condenser serves also as a memory capacitor to insure that the vacuum tube 311 is rendered conductive whenever both tubes are momentarily rendered non-conducting during a change of state in which vacuum tube 311 was previously non-conductive.

A voltage divider network which constitutes part of the load circuit for the anode 313, includes resistors 328, 329 and 324 serially connected between the anode 313 and the source of —300 volts. Control voltage for the grid 315 of the vacuum tube 310 is obtained from the junction point of the resistors 328 and 329 through a resistor 333. A condenser 332, connected in parallel with the resistor 328, serves as a compensating capacitor which helps to insure that the voltage wave at the anode 313 during a change of state is applied with sufficient amplitude and proper shape to the grid 315. This condenser serves also as a memory capacitor to insure that the vacuum tube 310 is rendered conductive whenever both tubes are momentarily non-conductive during a change of state where vacuum tube 310 was previously non-conductive.

A resistor 334, connected between the resistor 324 and the common connection point of the cathodes 335 and 336, provides cathode degeneration for the two amplifying tubes 310 and 311. The charge on a by-pass condenser 337, connected across the resistor 334, is little affected by a short duration input pulse, and the effect of this condenser is to hold the cathodes 335 and 336 at substantially the same potential at all times. Thus a negative pulse applied across, the grid-cathode circuit of the conducting tube creates no appreciable change in potential at the cathodes 335 and 336.

A positive input pulse to a primary winding 340 of a transformer 341 establishes a negative pulse on a secondary winding 342. The secondary winding 342 is serially connected with a diode 343 and the resistor 326 between the grid 314 and the cathode 336. A negative pulse on the secondary winding 342 is passed by the diode 343 provided the potential on its anode 344 is positive relative to the potential at its cathode 345. When the vacuum tube 311 is nonconducting, its grid potential is at or below cut off, and a negative pulse, whether passed by diode 343 or not, does not affect the non-conducting state of this vacuum tube. If the vacuum tube 311 is conducting, however, its grid bias potential is approximately zero volts or slightly positive which conditions diode 343 to the threshold of conduction. A negative pulse across the secondary winding 342 now causes the potential at the cathode 345 of the diode 343 to go further negative; whereupon the diode 343 passes the negative pulse to the grid 314 and stops conduction in the vacuum tube 311. A diode 346, connected across the secondary winding 342, serves to dissipate and limit positive overshoot voltages which occur on the upper side of the secondary winding 342 as a result of the decay of a positive pulse on the primary winding 340.

A negative going signal applied to input terminal 304 is coupled through a series circuit including a condenser 350, a diode 351 and the resistor 333 to the grid 315 of the vacuum tube 310. A resistor 352 is connected between the cathode 335 and the junction point of the diode 351 and the condenser 350. The resistor 352 and the condenser 350 serve as a differentiating circuit which helps to make the leading edge of the negative going input signal more steep and consequently reduce the fall time of the leading edge. A negative going input signal on the input terminal 304, when sufficiently negative, drives the grid 315 below cutoff and prevents current conduction through the vacuum tube 310.

The input terminal 304 in FIG. 8 is connected to the output terminal of the AND circuit 60 in FIG. 1. When the output signal level of the AND circuit 60 changes from positive 10 volts to negative 30 volts, the negative going level is coupled to the grid 315 (FIG. 8), and the vacuum tube 310 is rendered non-conductive. It is noted that flip-flop 70 is normally in the ZERO state, i.e. vacuum tube 312 is conducting and output terminal 306 is at a negative D.C. level. Diodes 353 and 354 clip their associated output terminals at positive 10 volts; whereas diodes 355 and 356 clip their associated output terminals at negative 30 volts.

In order to illustrate the operation of the flip-flop 9, assume a positive pulse is applied to the primary winding 340 of the transformer 341 when the vacuum tube 311 is conducting. The diode 343, which is at the threshold of conduction because the grid bias of the vacuum tube 311 is zero or slightly positive, passes the resulting negative pulse produced across the secondary winding 342 to the grid 314. As the grid 314 goes negative beyond cutoff, the potential at the anode 313 of the vacuum tube 311 rises toward +90 volts but is clamped at +10 volts by diode 354. This positive going potential is coupled through the resistor 328 and the condenser 332 to the grid 314 and initiates conduction in the vacuum tube 312 as soon as its grid potential rises above the cutoff potential. As conduction commences in the vacuum tube 310, its anode potential starts decreasing from +10 volts until at full conduction it reaches —30 volts. This decreasing potential at the anode 312 is coupled through the resistor 322 and the condenser 327 to the grid 314 and maintains the grid 314 below the cutoff potential. In this condition with the vacuum tube 310 conducting and the vacuum tube 311 non-conducting, the flip-flop circuit is said to be in the ZERO state of conduction.

If a negative going signal level is now applied to the input terminal 304, the negative pulse is passed by the diode 351 and applied to the grid 315. As the grid 315 goes negative beyond cutoff, the potential at the anode 312 of the vacuum tube 310 rises toward +90 volts but is clamped at +10 volts by diode 353. This positive going potential is coupled through the resistor 322 and the condenser 327 to the grid 314 and initiates conduction in the vacuum tube 311 as soon as its grid potential rises above the cutoff potential. As conduction commences in the vacuum tube 311, its anode potential starts decreasing from +10 volts until at full conduction it reaches −30 volts. This decreasing potential at anode 313 is coupled through the resistor 328 and the condenser 332 to the grid 315 and maintains the grid 315 below the cutoff potential. In this condition with the vacuum tube 310 nonconducting and the vacuum tube 313 conducting, the flip-flop circuit is said to be in the ONE state. It is noted that in each case above, pulses are applied to the input terminal of the conducting tube to drive the conducting tube to the non-conducting condition.

The above-described flip-flop circuit is also used for the flip-flop 15 in FIG. 1 except the value of condenser 350 is changed to 82 micro-micro-farads.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A counting device comprising in combination, a register having stages for storing N digits where N is any whole number greater than one, said stages connected to form a ring circuit, means coupled to said register for inserting the complement of zero in said register, a subtracter coupled to said register for subtracting any number X of ones successively from the content of said register where X is any number having digits equal in number to or less than N, shifting means associated with said register for advancing information around said register, means for inhibiting and writing in said register coupled to said register to inhibit the advance of a one from the lowest order digit stage when said subtracter contains a one and said lowest order digit stage also contains a one and for causing a one to be written in the next to the highest order digit stage when said subtracter contains a one, and readout means coupled to said register adapted to provide a serial readout of the content of said register without affecting the operation of said register including means coupled to said readout means for providing the complement of the content readout of said register whereby the number X is yielded by said last-named means.

2. A binary counting device comprising a magnetic core register connected to form a closed loop, means for inserting the complement of zero in said magnetic core register, said register having a magnetic core for each digit and means coupled between said cores for shifting information from each core to a succeeding core, a magnetic core subtracter means connected to said magnetic core register for subtracting a number X from the complement of zero in said magnetic core register by successively subtracting a one until the number X is obtained, said subtracter means including means to inhibit the shifting of a one from the lowest order digit when said subtracter has a one and further means to write a one in the next to the highest order digit when said subtracter has a one and the highest order digit is zero, and readout means coupled to said magnetic core register adapted to provide a serial readout of the content of said magnetic core register without affecting the operation of said magnetic core register including means associated with said readout means for taking the complement of the content readout of said magnetic core register whereby the number X is derived from said last named-means.

3. A binary counting device comprising a shift register having a plurality of stages connected to form a closed loop, means for inserting the complement of the binary value ZERO in said shift register, a subtracter coupled to said shift register adapted to successively subtract the binary value ONE from the content of said register, control means for applying actuating signals to said shift register to advance the information around said register after each subtraction operation and readout means coupled to said register adapted to provide a serial readout of the content of said register without affecting the counting operation of said register.

4. The binary counting device as claimed in claim 3 wherein said control means includes a control register having the same number of stages as said shift register adapted to control the number of pulses applied to said shift register by said control means during each subtraction operation.

5. The binary counting device as claimed in claim 3 wherein said readout means is responsive to said actuating signals from said control means and said readout means further includes means for providing the complement of the content of said shift register.

References Cited by the Examiner

UNITED STATES PATENTS

| | | | |
|---|---|---|---|
| 2,755,459 | 7/1956 | Carbrey | 340—347 |
| 2,758,788 | 8/1956 | Yaeger | 340—347 |
| 2,778,006 | 1/1957 | Guterman | 340—174 |
| 2,787,416 | 4/1957 | Hansen | 340—174 |
| 2,825,890 | 3/1958 | Ridler et al. | 340—174 |
| 2,852,699 | 9/1958 | Ruhman | 340—174 |
| 2,935,735 | 5/1960 | Kodis et al. | 340—174 |
| 2,968,791 | 1/1961 | Johnson | 340—172.5 |
| 3,027,545 | 3/1962 | Kodis | 340—174 |

ROBERT C. BAILEY, *Primary Examiner.*

EVERETT R. REYNOLDS, MALCOLM A. MORRISON, *Examiners.*